(12) United States Patent
Soejima et al.

(10) Patent No.: US 10,391,399 B2
(45) Date of Patent: Aug. 27, 2019

(54) PROGRAM, ELECTRONIC DEVICE, AND METHOD THAT IMPROVE EASE OF OPERATION FOR USER INPUT

(71) Applicant: CYGAMES, INC., Tokyo (JP)

(72) Inventors: Yasutaka Soejima, Tokyo (JP); Kohei Kamata, Tokyo (JP)

(73) Assignee: CYGAMES, INC., Tokyo (JP)

( * ) Notice: Subject to any disclaimer, the term of this patent is extended or adjusted under 35 U.S.C. 154(b) by 134 days.

(21) Appl. No.: 15/783,824

(22) Filed: Oct. 13, 2017

(65) Prior Publication Data

US 2018/0043254 A1 Feb. 15, 2018

Related U.S. Application Data

(63) Continuation of application No. PCT/JP2016/061675, filed on Apr. 11, 2016.

(30) Foreign Application Priority Data

Apr. 13, 2015 (JP) ................................. 2015-081804

(51) Int. Cl.
*A63F 13/00* (2014.01)
*A63F 13/426* (2014.01)
(Continued)

(52) U.S. Cl.
CPC ........ *A63F 13/426* (2014.09); *A63F 13/2145* (2014.09); *A63F 13/92* (2014.09); *G06F 3/0488* (2013.01); *G06F 3/04883* (2013.01)

(58) Field of Classification Search
None
See application file for complete search history.

(56) References Cited

U.S. PATENT DOCUMENTS

2006/0094503 A1* 5/2006 Ajioka .................... A63F 13/10
463/32
2006/0116203 A1* 6/2006 Nakada ................... A63F 13/10
463/30

(Continued)

FOREIGN PATENT DOCUMENTS

JP 2006-150062 A 6/2006
JP 4932010 B2 5/2012
(Continued)

OTHER PUBLICATIONS

International Search Report issued in PCT/JP2016/061675, dated Jul. 12, 2016 (1 page).

(Continued)

*Primary Examiner* — Paul A D'Agostino
(74) *Attorney, Agent, or Firm* — Osha Liang LLP

(57) ABSTRACT

The present invention provides a program for a game that is executed at an electronic device that includes a display and a contact-type position input device, the program causing the electronic device to execute setting an operation reference position in a coordinate plane; determining whether a touch is being made on the contact-type position input device; setting an operation position in the coordinate plane in accordance with a touched position that is acquired; moving an object that is displayed on the display in the game, on the basis of the operation reference position and the operation position; saving the operation position as a displacement reference position; detecting a touched-position movement from the displacement reference position, the touched-position movement satisfying a predetermined condition; and resetting the operation reference position in the coordinate plane in a case where a touched-position movement satisfying the predetermined condition is detected.

13 Claims, 18 Drawing Sheets

(51) Int. Cl.
*G06F 3/0488* (2013.01)
*A63F 13/2145* (2014.01)
*A63F 13/92* (2014.01)

(56) References Cited

U.S. PATENT DOCUMENTS

| | | | |
|---|---|---|---|
| 2006/0128468 A1* | 6/2006 | Yoshikawa | A63F 13/10 463/36 |
| 2006/0281549 A1* | 12/2006 | Iwamoto | A63F 13/10 463/37 |
| 2008/0026843 A1* | 1/2008 | Nakasaka | A63F 13/00 463/37 |
| 2011/0172013 A1 | 7/2011 | Shirasaka et al. | |
| 2013/0024806 A1* | 1/2013 | Funabashi | G06F 3/04886 715/781 |
| 2013/0150165 A1* | 6/2013 | Takahashi | G06F 3/0488 463/37 |
| 2013/0316817 A1* | 11/2013 | Tanzawa | G06F 3/0488 463/31 |
| 2013/0331182 A1* | 12/2013 | Tanzawa | A63F 13/426 463/31 |
| 2015/0072784 A1 | 3/2015 | Lee | |
| 2015/0231509 A1* | 8/2015 | McMain, II | A63F 13/837 463/31 |
| 2016/0193533 A1* | 7/2016 | Hirakawa | A63F 13/422 463/43 |

FOREIGN PATENT DOCUMENTS

| | | |
|---|---|---|
| JP | 2013-511759 A | 4/2013 |
| JP | 5487262 B2 | 5/2014 |

OTHER PUBLICATIONS

Written Opinion issued in PCT/JP2016/061675, dated Jul. 12, 2016 (3 pages).

* cited by examiner

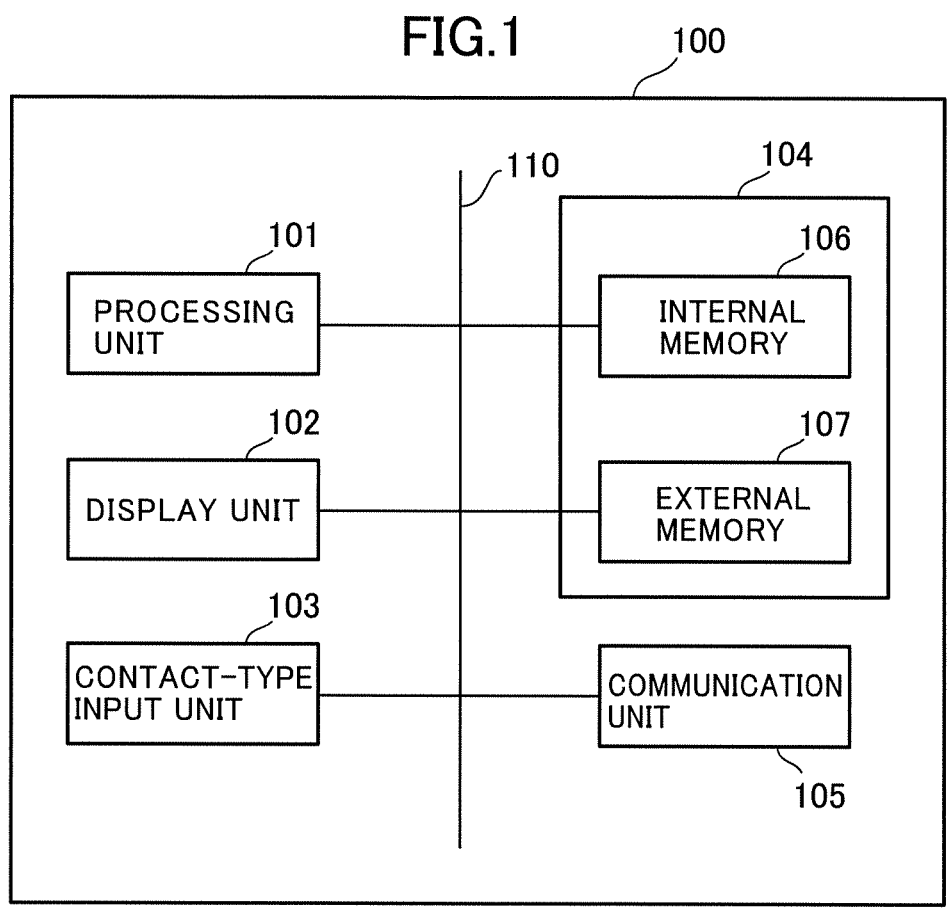

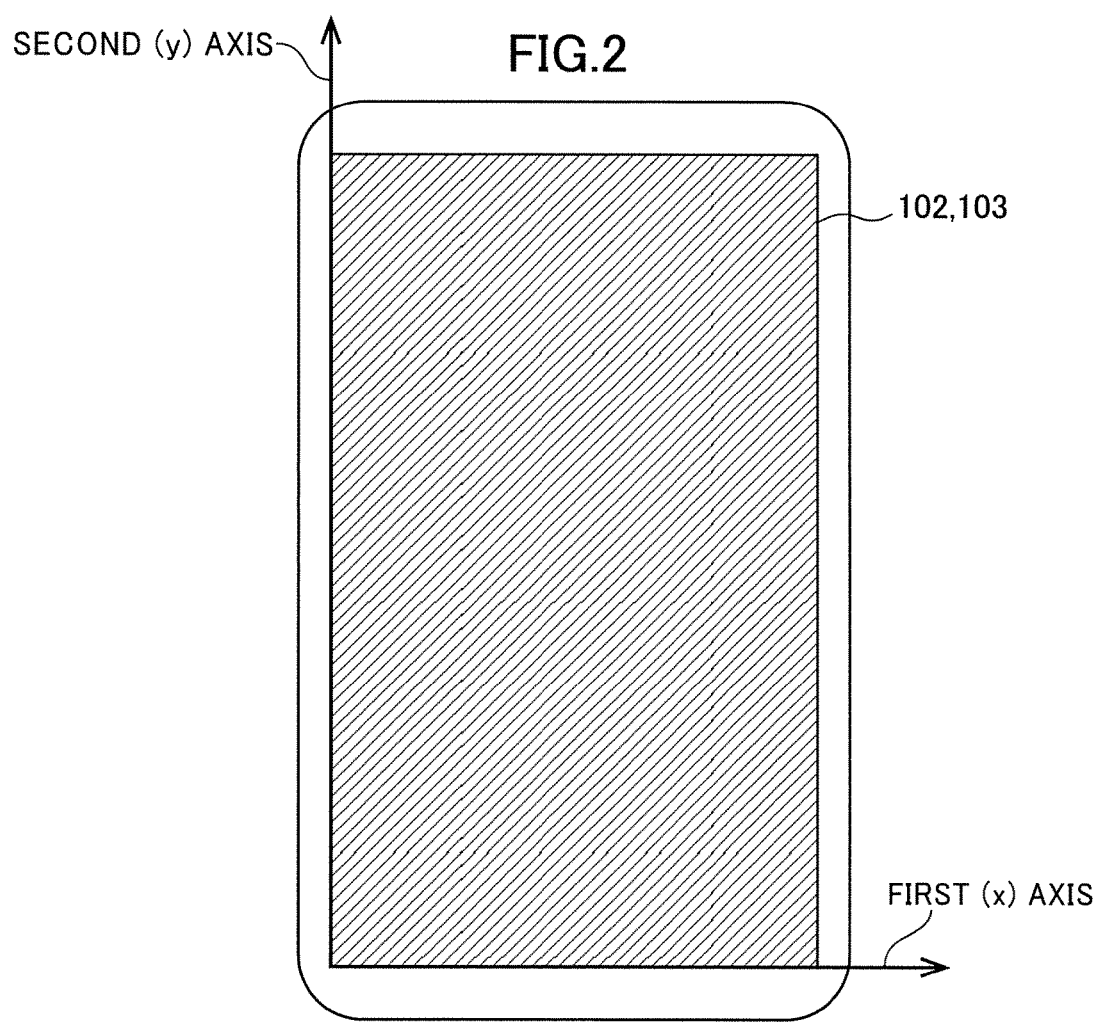

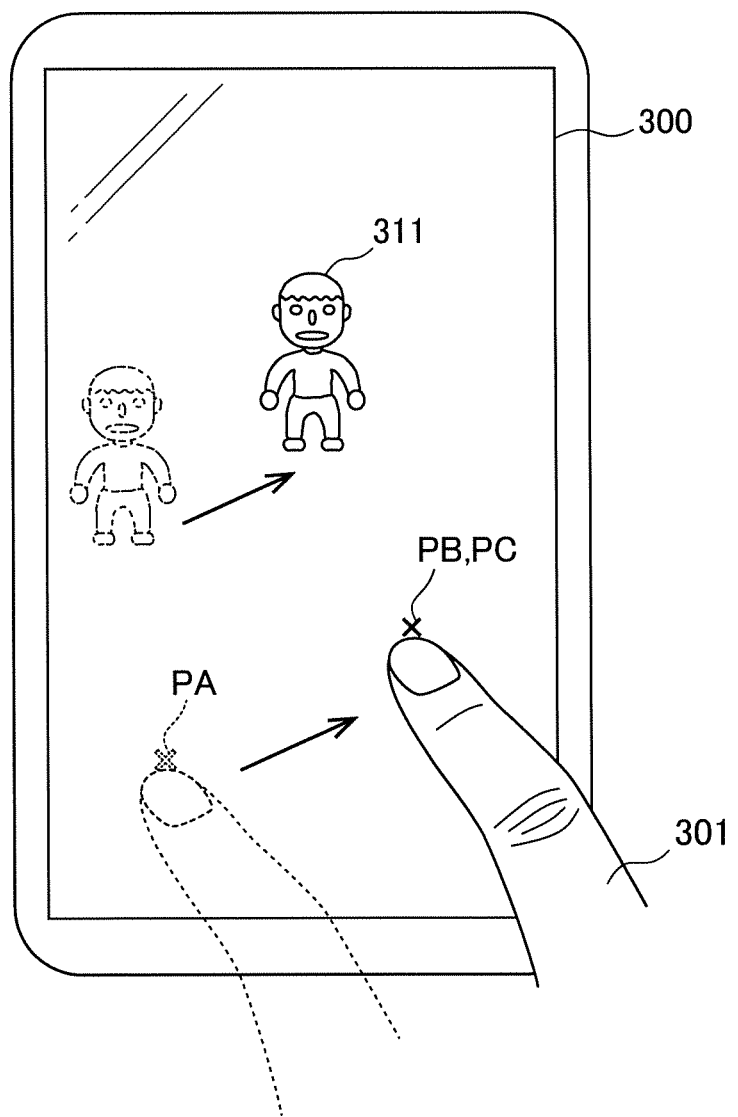

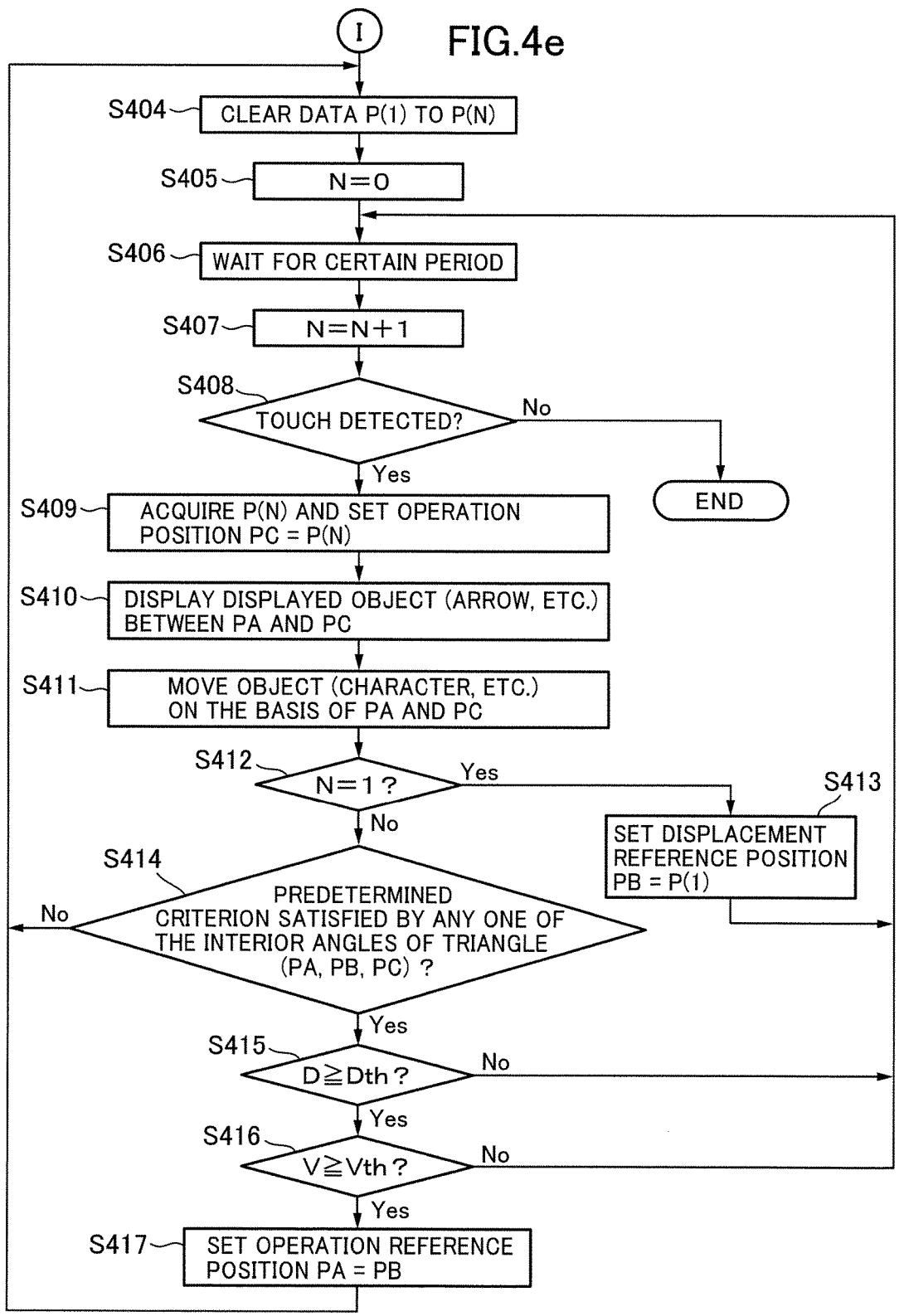

PROGRAM, ELECTRONIC DEVICE, AND METHOD THAT IMPROVE EASE OF OPERATION FOR USER INPUT

TECHNICAL FIELD

The present invention relates to a program, an electronic device, and a method that improve the ease of operation of user input at the electronic device.

BACKGROUND ART

With recent improvements in touchscreen technology, electronic devices that receive user inputs via user interfaces on touchscreens have come into widespread use. Furthermore, in games that are executed on electronic devices, user input via touchscreens provided on electronic devices is coming into widespread use as an alternative to conventional user input using physical controllers.

In particular, compact portable electronic devices, such as smartphones, are rapidly coming into common use, and many games that are executed on such portable electronic devices are also being released. In view of this situation, various technologies related to methods of operating an object (e.g., a player character) displayed on a touchscreen have been proposed. For example, Patent Literature 1 describes that when a touchscreen is touched, a virtual controller is displayed at the touched position. Furthermore, Patent Literature 2 describes that an operation reference position of a touchscreen is defined on the basis of a detected touched position, an operation instruction is generated in accordance with the direction from the operation reference position to the latest touched position, and the operation reference position is moved so as to be closer to the latest touched position when the latest touched position is moved.

CITATION LIST

Patent Literature

{PTL 1}
Publication of Japanese Patent No. 4932010
{PTL 2}
Publication of Japanese Patent No. 5487262

SUMMARY OF INVENTION

Technical Problem

However, if the operation reference position or the virtual controller is fixed, in the case where the user wishes to make an input so as to move the object in the reverse direction after moving the object by moving the touched position by a large amount from the operation reference position, the user has to move back the touched position by a large amount. Furthermore, in the case where the direction and distance of movement of the object are based on the direction and distance of the touched position relative to the operation reference position, the user, when intending to move the object in the reverse direction, has to move the touched position through the operation reference position to the opposite side. At this time, in the process in which the touched position approaches the operation reference position, the object gradually slows down and comes to a halt upon reaching the operation reference position. Then, when the touched position is moved to the opposite side across the operation reference position, the object is reversed, and the touched position is moved in the opposite direction while being accelerated as it becomes farther from the operation reference position. In some cases, this kind of object operation does not appropriately reflect the user's intent. Specifically, for example, in the case where an obstacle is approaching from the advancing direction in a game, the user will intend to avoid the obstacle by quickly reversing the object and moving it in the opposite direction at high speed. However, in the case where the current input technology is used, the object has to necessarily undergo the process of decreasing the movement speed in the current advancing direction, stopping, reversing, starting movement in the opposite direction at low speed, and gradually accelerating. In this case, even if the user quickly makes an input for reverse movement, it is not possible to avoid the obstacle since it is not possible to quickly move the object in the opposite direction at high speed.

With the method of moving the operation reference position so as to approach the latest touched position, since it is possible to move the operation reference position so as to follow the latest touched position such that the latest touched position of the user will be kept within a predetermined distance from the operation reference position, it is not necessary to move the touched position by the predetermined distance or more even in the case where the user wishes to reverse and move the object. Nonetheless, it is necessary to perform a touch operation in which the touched position is moved back to the operation reference position and is then moved to the opposite side of the operation reference position. Furthermore, also in the case where the user wishes to reverse and move the object, it is nonetheless necessary to undergo the process of decreasing the movement speed in the current advancing direction, stopping, reversing, starting movement in the opposite direction at low speed, and gradually accelerating. Furthermore, for a user who does not wish to move the operation reference position, the method of constantly moving the operation reference position so as to approach the latest touched position involves the possibility of exercising unintended control.

Solution to Problem

The present invention has been made in view of the problems described above and has the following features. Specifically, a non-transitory computer readable medium storing a program according to an aspect of the present invention is a non-transitory computer readable medium storing a program for a game that is executed at an electronic device that includes a display and a contact-type position input device and that acquires a touched position corresponding to a touch on the contact-type position input device as coordinates in a coordinate plane corresponding to an input position on the contact-type position input device, the program causing the electronic device to execute a step of setting an operation reference position in the coordinate plane; a step of determining whether a touch is being made on the contact-type position input device; a step of setting an operation position in the coordinate plane in accordance with a touched position that is acquired in a case where a touch is being made on the contact-type position input device; a step of moving an object that is displayed on the display in the game, on the basis of the operation reference position and the operation position; a step of retaining the operation position as a displacement reference position; a step of detecting a touched-position movement from the displacement reference position, the touched-position movement satisfying a predetermined condition; and a step of resetting the operation reference position in the coordinate plane in a case where a touched-position movement satisfying the predetermined condition is detected, wherein the predetermined condition at least includes a condition that a predetermined criterion is satisfied by one of the interior angles of a triangle formed by three points consisting of a displacement position, the operation reference position, and the displacement reference position, the displacement position being a touched position that is acquired after the operation position retained as the displacement reference position is acquired.

In an aspect of the present invention, in the step of moving an object that is displayed on the display in the game, the object that is displayed on the display in the game is moved on the basis of at least one of the direction from the operation reference position toward the operation position and the distance between the operation reference position and the operation position.

In an aspect of the present invention, the predetermined criterion is a criterion that the angle formed by a straight line BA and a straight line BC or the angle formed by a straight line CA and a straight line CB is smaller than or equal to a predetermined angle or the angle formed by a straight line AB and a straight line AC is larger than or equal to the predetermined angle, where A signifies the operation reference position, B signifies the displacement reference position, and C signifies the displacement position.

In an aspect of the present invention, the predetermined condition further includes a condition that the speed of the touched-position movement from the displacement reference position to the displacement position is faster than or equal to a predetermined speed and/or a condition that the displacement position is distant from the displacement reference position by at least a predetermined distance.

In an aspect of the present invention, in the step of resetting the operation reference position in a case where a touched-position movement satisfying the predetermined condition is detected, the operation reference position is reset on the basis of at least one of the displacement reference position and the displacement position in a case where a touched-position movement satisfying the predetermined condition is detected.

The program according to the aspect of the present invention further causes the electronic device to execute a step of displaying a displayed object between a position corresponding to the operation reference position and a position corresponding to the operation position on the display, the displayed object serving to explicitly indicate the direction from the operation reference position toward the operation position to a user.

In one aspect of the present invention, the electronic device is a portable electronic device, and the display and the contact-type position input device are implemented together as a touchscreen.

A server according to an aspect of the present invention is a server that supplies the program to an electronic device.

An electronic device according to an aspect of the present invention is an electronic device including a display, a contact-type position input device, and a non-transitory computer readable medium having stored thereon a program for a game, in which a touched position corresponding to a touch on the contact-type position input device is acquired as coordinates in a coordinate plane corresponding to an input position on the contact-type position input device, the program causing the electronic device to execute a step of setting an operation reference position in the coordinate plane; a step of determining whether a touch is being made on the contact-type position input device; a step of setting an operation position in the coordinate plane in accordance with a touched position that is acquired in a case where a touch is being made on the contact-type position input device; a step of moving an object that is displayed on the display in the game, on the basis of the operation reference position and the operation position; a step of retaining the operation position as a displacement reference position; a step of detecting a touched-position movement from the displacement reference position, the touched-position movement satisfying a predetermined condition; and a step of resetting the operation reference position in the coordinate plane in a case where a touched-position movement satisfying the predetermined condition is detected, wherein the predetermined condition at least includes a condition that a predetermined criterion is satisfied by one of the interior angles of a triangle formed by three points consisting of a touched position that is acquired after the operation position retained as the displacement reference position is acquired, the operation reference position, and the displacement reference position.

An electronic device according to an aspect of the present invention is an electronic device that includes a display and a contact-type position input device and that is capable of executing a game, the electronic device including a touched-position acquisition unit configured to acquire a touched position corresponding to a touch on the contact-type position input device as coordinates in a coordinate plane corresponding to an input position on the contact-type position input device; an operation-reference-position setting part configured to set an operation reference position in the coordinate plane; an operation position setting part configured to set an operation position in the coordinate plane in accordance with a touched position that is acquired in a case where a touch is being made on the contact-type position input device; an object displaying part configured to move an object that is displayed on the display in the game, on the basis of the operation reference position and the operation position; a displacement-reference-position retaining part configured to retain the operation position as a displacement reference position; a touch-operation detecting part configured to detect a touched-position movement from the displacement reference position, the touched-position movement satisfying a predetermined condition; and an operation-reference-position resetting part configured to reset the operation reference position in the coordinate plane in a case where a touched-position movement satisfying the predetermined condition is detected, wherein the predetermined condition at least includes a condition that a predetermined criterion is satisfied by one of the interior angles of a triangle formed by three points consisting of a touched position that is acquired after the operation position saved as the displacement reference position is acquired, the operation reference position, and the displacement reference position.

A method according to an aspect of the present invention is a method for a game that is executed at an electronic device that includes a display and a contact-type position input device and that acquires a touched position corresponding to a touch on the contact-type position input device as coordinates in a coordinate plane corresponding to an input position on the contact-type position input device, the method including a step of setting an operation reference position in the coordinate plane; a step of determining whether a touch is being made on the contact-type position input device; a step of setting an operation position in the coordinate plane in accordance with a touched position that is acquired in a case where a touch is being made on the contact-type position input device; a step of moving an object that is displayed on the display in the game, on the basis of the operation reference position and the operation position; a step of retaining the operation position as a displacement reference position; a step of detecting a touched-position movement from the displacement reference position, the touched-position movement satisfying a predetermined condition; and a step of resetting the operation reference position in the coordinate plane in a case where a touched-position movement satisfying the predetermined condition is detected, wherein the predetermined condition at least includes a condition that a predetermined criterion is satisfied by one of the interior angles of a triangle formed by three points consisting of a touched position that is acquired after the operation position saved as the displacement reference position is acquired, the operation reference position, and the displacement reference position.

Advantageous Effects of Invention

The present invention serves to improve the ease of operating an object. Since it is possible to change (reset) an operation reference position by a touched-position movement satisfying a predetermined condition, in the case where the user wishes to make an input in the reverse direction after considerably moving a touched position from the operation reference position, the user can make an input in the reverse direction without having to considerably move back the touched position, which improves the ease of operation. Furthermore, it is possible to reverse the object so as to move it in the direction opposite to the direction of the immediately preceding movement without having to slow down, which enables quick object reversing operations by the user. Furthermore, since the operation reference position is not reset unless a touched-position movement satisfying the predetermined condition is performed, the possibility of resetting the operation reference position when not so intended by the user is reduced.

BRIEF DESCRIPTION OF DRAWINGS

FIG. 1 is a diagram showing the configuration of an electronic device according to an embodiment of the present invention.

FIG. 2 illustrates a display unit having coordinate axes in the electronic device according to the embodiment of the present invention.

FIG. 3c is an illustration for explaining control of an object by a touch operation according to the embodiment of the present invention.

FIG. 4e is a flowchart according to a second embodiment of the present invention.

DESCRIPTION OF EMBODIMENTS

Figure 3A:
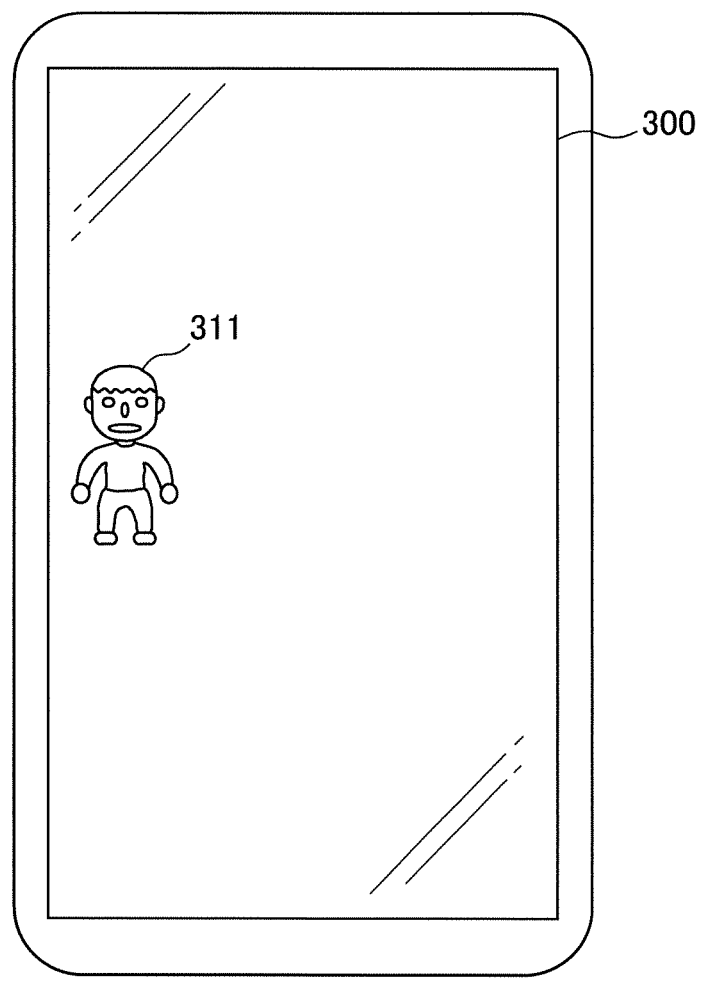
FIG. 3a is an illustration for explaining control of an object by a touch operation according to the embodiment of the present invention.

Now, programs, electronic devices, and methods according to the present invention will be described with reference to the drawings. First, the configuration of an electronic device according to the present invention will be described, and then specific processing will be described.

[Overview of the Configuration of an Electronic Device]

FIG. 1 shows an example of a configuration diagram of an electronic device 100 according to the present invention. The electronic device 100 includes a processing unit 101, a display unit 102, a contact-type input unit 103, a storage unit 104, and a communication unit 105. Although these components are connected to each other via a bus 110 in the embodiments, alternatively, the components may be connected individually as needed.

The electronic device 100 is preferably a smartphone; however, it may be a computer equipped with a contact-type input device, such as a mobile phone, a mobile information terminal, a tablet computer, a video game machine, a portable video game machine, or a touchpad.

The processing unit 101 executes various kinds of processing, such as game processing and image generation processing, on the basis of programs and data input from the contact-type input unit 103. The processing unit 101 includes a processor that controls the components of the electronic device 100, and it executes various kinds of processing by using the storage unit 104 as a work area.

The storage unit 104 includes an internal memory 106 and/or an external memory 107. The internal memory 106 may be any type of memory that can store information, such as a non-volatile memory or a volatile memory. The storage unit 104 may also be a hard disk. For example, in the case where the electronic device 100 is a smartphone, the storage unit 104 includes a ROM and a RAM. The internal memory 106 stores programs for executing the present invention and various kinds of data that can be referred to as the programs are executed. The programs may include programs for all kinds of applications requiring user input, such as a video game and a web browser. The various kinds of data include, for example, image data for displaying various kinds of images in a game, and coordinate data that can be written to the storage unit 104 during a game, which will be described later. The external memory 107 is a removable memory, such as a memory card, and may be any kind of external storage device. Data that is stored in the internal memory 106 may alternatively be stored in the external memory 107. For example, the programs for executing the present invention may be stored in the external memory 107 and executed by the electronic device 100.

The communication unit 105 carries out wireless communications, such as mobile communications or wireless LAN communications, and wired communications using an Ethernet (registered trademark) cable, a USB cable, or the like. The communication unit 105 makes it possible to download a program from a server and to store the program in the storage unit 104. It is also possible to store a program in an optical disk, such as a CD or a DVD, to connect an optical drive to the communication unit 105, and to read the program, etc. from the optical disk and to store the program, etc. in the storage unit 104.

The display unit (display) 102 displays images that are output by programs executed at the electronic device 100. Although the display unit 102 is preferably a liquid crystal display, alternatively, it may be an organic EL display or a plasma display.

The contact-type input unit 103 provides the electronic device 100 with an input based on a position where a contact is made (touched) by a user (player), for example, like a touchpad. Preferably, the display unit 102 and the contact-type input unit 103 are integrated in the form of a touchscreen; alternatively, however, the display unit 102 and the contact-type input unit 103 may be disposed separately and at different positions. For example, in the case where the display unit 102 and the contact-type input unit 103 are integrated in the form of a touchscreen, an input by a user's touch on the display unit 102 is accepted, and the contact-type input unit 103 detects the coordinates corresponding to the position touched by the user and supplies the coordinates to the electronic device 100. Although any detection method (e.g., a capacitive detection method for a touchscreen) may be used, preferably, the contact-type input unit 103 should detect contacts simultaneously made by a user's finger or the like at two points or more and supply coordinate information corresponding to the individual detected positions to the electronic device 100.

For example, in the case where a smartphone is used as the electronic device 100, the display unit 102 and the contact-type input unit 103 are integrated in the form of a touchscreen. In the contact-type input unit 103, a position is designated in the form of coordinates by using a coordinate plane defined by a first axis and a second axis substantially perpendicular to the first axis. Preferably, as shown in FIG. 2, the first axis is substantially parallel to the shorter sides of the display unit 102 (the contact-type input unit 103), which has a substantially rectangular shape, the second axis is substantially parallel to the longer sides of the display unit 102, and a position is represented in the form of coordinates (x, y) based on a coordinate axis (horizontal axis) in the first axis direction and a coordinate axis (vertical axis) in the second axis direction. The processing unit 101 can obtain, by using a program, etc., a touched position detected by the touchscreen in the form of data indicating such coordinates (x, y). For example, in the case where the detection precision of the touchscreen is 640 dots×1136 dots, a resolution of 640 dots in the horizontal axis direction and 1136 dots in the vertical axis direction can be attained. In this case, each dot may be either a single point or a certain region (cell). It is to be noted, however, that the distance between dots usually varies among touchscreens (electronic devices). In this specification, the term "distance" should be construed to mean the distance in coordinates unless explicitly mentioned otherwise. The setting of coordinates shown in FIG. 2 is an example, and coordinate axes can also be set by a program. Alternatively, polar coordinates can be set, and other kinds of coordinate system can be set through coordinate transformation.

As another example, in the case where the display unit 102 and the contact-type input unit 103 are disposed separately at different positions, it is possible to set coordinates as described above in the contact-type input unit 103 while setting coordinates corresponding to the coordinates for the contact-type input unit 103 in the display unit 102.

First Embodiment

The operation of the present invention in a first embodiment of the present invention will now be described. In this embodiment, a smartphone is used as the electronic device 100, and in a game that is executed by using the smartphone, an object (player character) that is displayed on a touchscreen 300 and operated by a user is controlled.

FIGS. 3a to 3i illustrate operations realized with touch operations on an object 311 displayed on the touchscreen 300 of the smartphone. FIGS. 4a to 4g are flowcharts showing information processing invoked by the touch operations. The operation of the present invention will be described by using these figures.

Figure 4A:
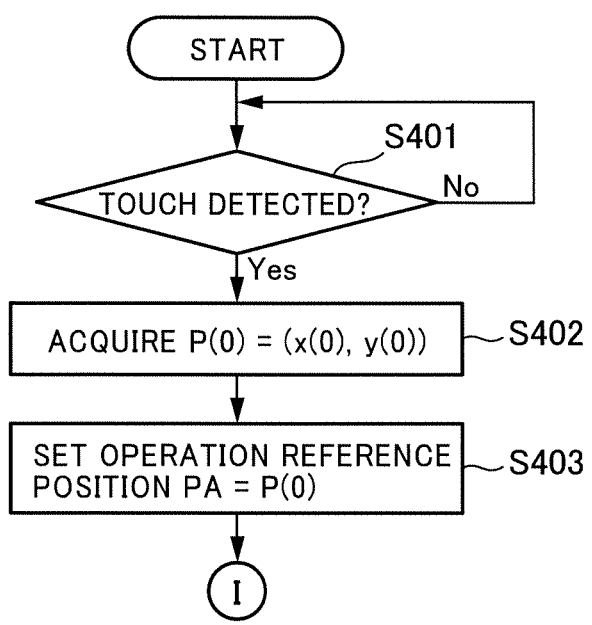
FIG. 4a is a flowchart according to a first embodiment of the present invention.
Figure 5:
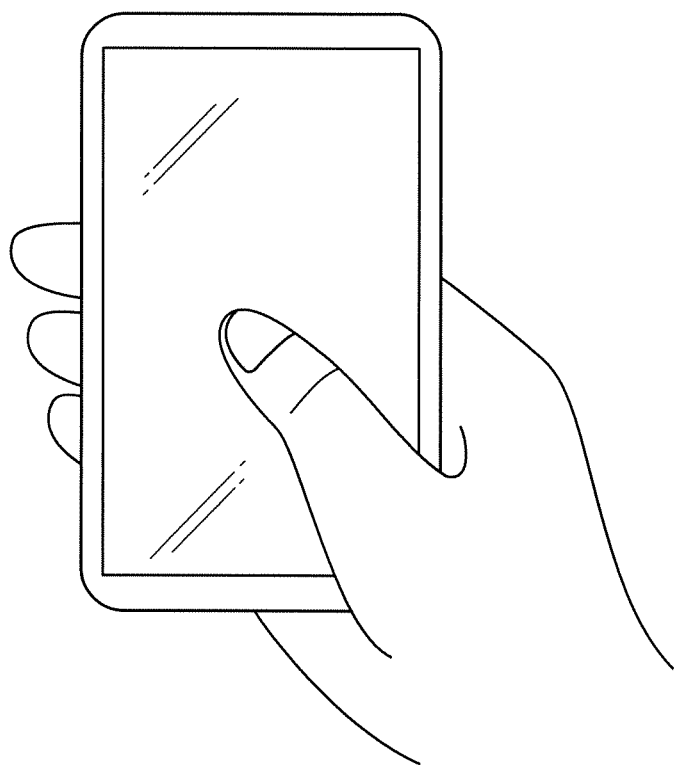
FIG. 5 is an illustration showing an example of a method of touch operation by a user at the electronic device according to the embodiment of the present invention.

FIG. 3a shows a game screen that is displayed on the touchscreen 300, in which the object 311 in a game space is displayed on the left side of the screen of the touchscreen 300. The user has not yet touched the touchscreen 300. In this stage, as shown in FIG. 4a, the smartphone waits for a touch (contact) on the touchscreen 300 by the user (step 401). In the description of this embodiment, it is assumed that a touch by the user is made with a finger of the user, and a touch may be made with any finger, or a touch may be made with something else, such as a stylus pen. As an example of a method for a user to perform a touch operation, the user holds a portrait-shaped casing with one hand and operates a touchscreen just with the thumb on that hand, as shown in FIG. 5.

Figure 3B:
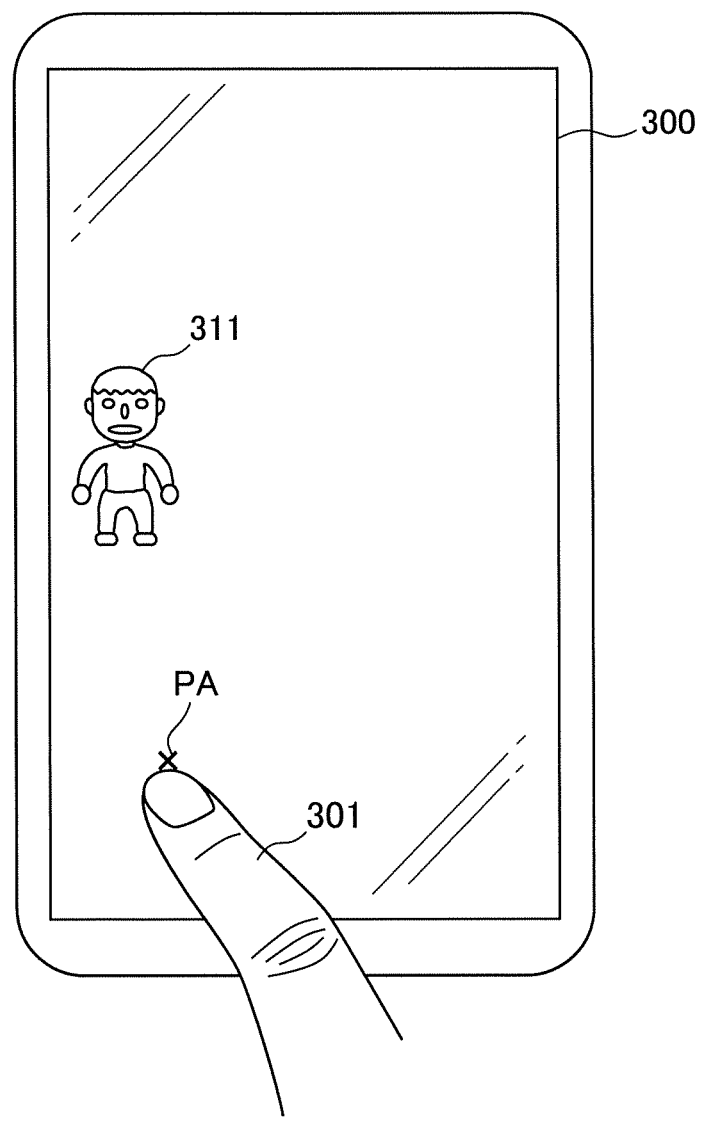
FIG. 3b is an illustration for explaining control of an object by a touch operation according to the embodiment of the present invention.

FIG. 3b shows a state where the touchscreen 300 is touched with a finger 301 of the user. In step 401, it is determined whether the touchscreen 300 is touched, and in the case where it is determined that the touchscreen 300 is touched, the touched position is detected in the form of coordinates. In step 402, the detected coordinates are obtained and stored in the storage unit 104 as P(0)=(x(0), y(0)). Then, in step 403, an operation reference position PA=(Ax, Ay) is set at the coordinates (x(0), y(0)) of the touched position on the touchscreen 300 and is stored in the storage unit 104. FIG. 3b also shows a state where the operation reference position PA has been set. Alternatively, the operation reference position may be set at a place whose position is shifted by a predetermined amount on the basis of the coordinates (x(0), y(0)) of the touched position. Alternatively, the operation reference position may be certain coordinates that are determined in advance. In this case, it is possible to omit steps 401 to 403.

Figure 4B:
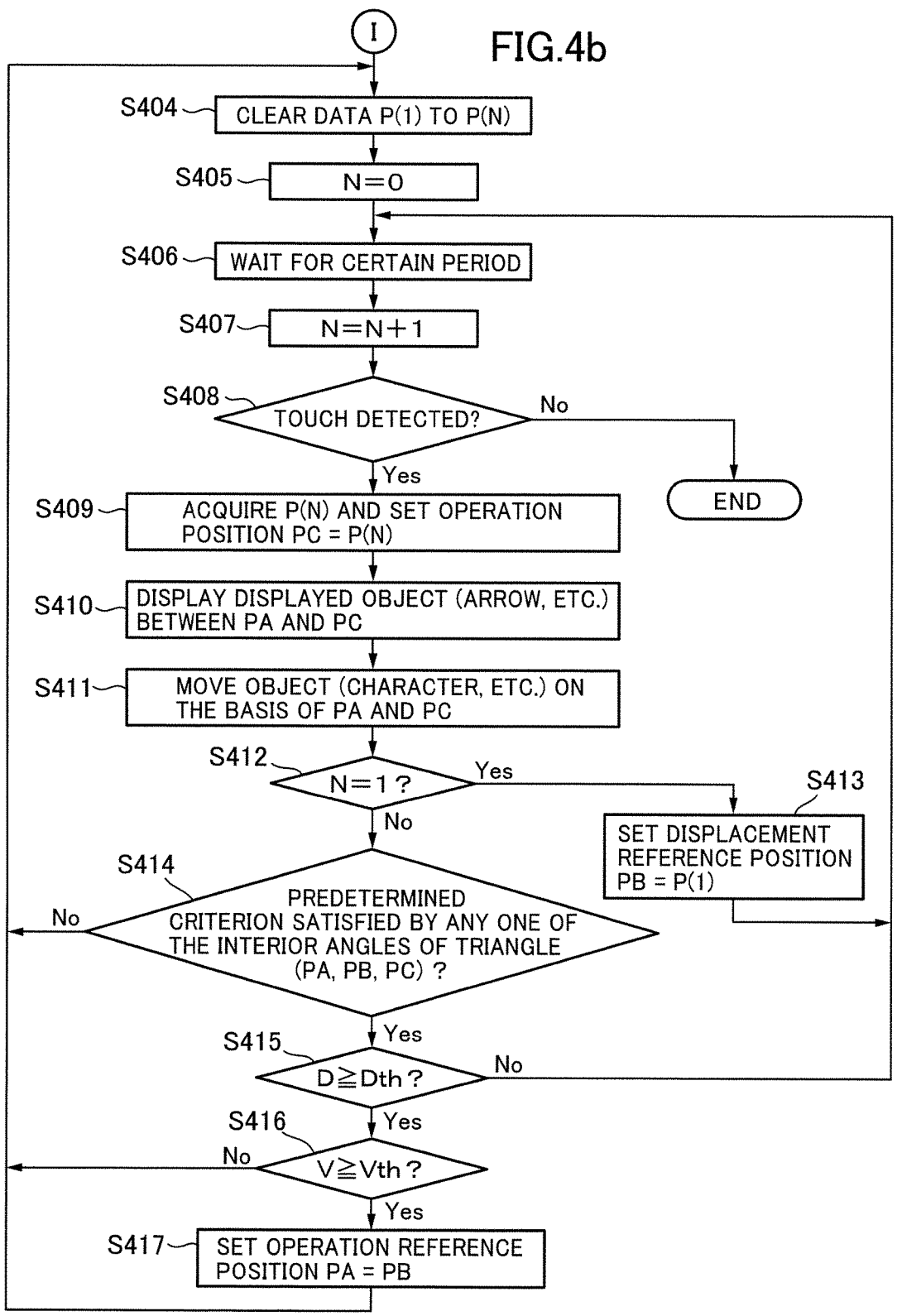
FIG. 4b is a flowchart according to the first embodiment of the present invention.

Then, as shown in FIG. 4b, data of coordinates P(1) to P(N) are cleared in step 404, and a counter N is set to 0 in step 405.

Then, in step 406, the elapse of a certain period for updating the screen is awaited. In this embodiment, a smartphone is used as the electronic device 100. Generally, a smartphone performs touch detection at regular intervals and updates the screen at regular intervals. For example, the unit time. At for updating the screen may be 1/30 second, 1/60 second, or 1/120 second. In the present flow, preferably, the elapse of a certain period is awaited so that touch detection will be performed in synchronization with the screen updating period. Alternatively, however, the waiting period may be a certain waiting period with which touch detection is performed in synchronization with a period that is an integer multiple of the screen updating period or an elapse of time needed for the smartphone to execute certain information processing.

In step 407, the counter N is incremented. Then, in step 408, it is determined whether or not the user is continuing to touch the touchscreen 300. In the case where the user has released the finger 301 from the touchscreen 300, the flow in the present flowchart is terminated. In the case where the flow is terminated, the flow in FIG. 4a is resumed from the start. In the case where certain coordinates that are determined in advance are used as the operation reference position and steps 401 to 403 are omitted, the flow is started from step 408.

Figure 3D:
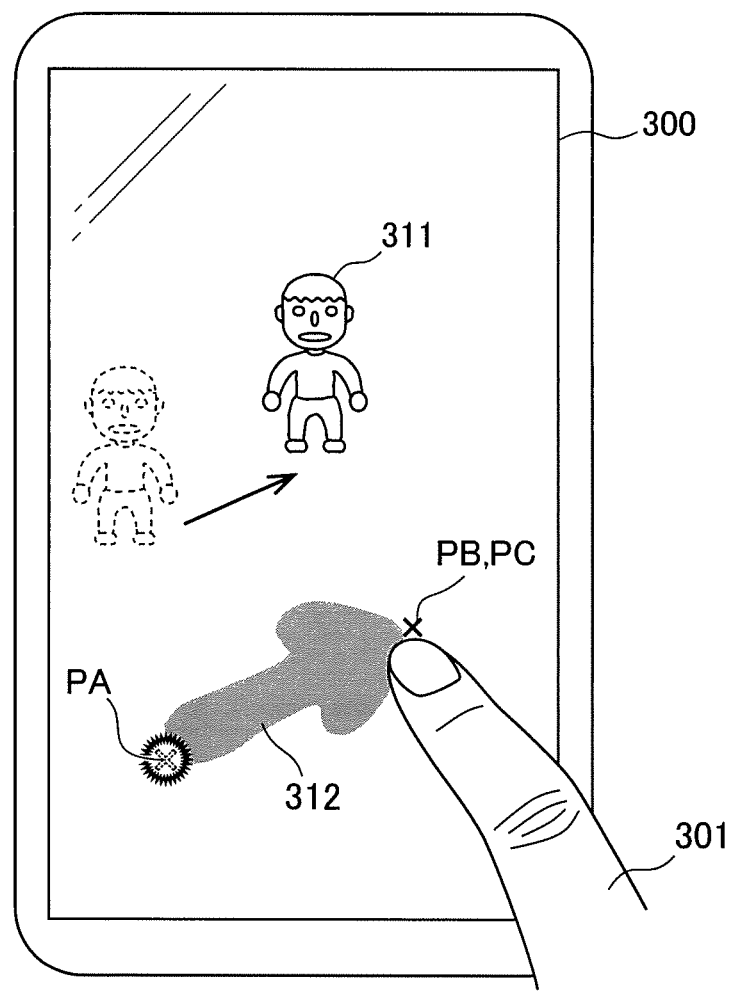
FIG. 3d is an illustration for explaining control of an object by a touch operation according to the embodiment of the present invention.

In the case where it is determined in step S408 that the user is touching the touchscreen 300, the touched position is detected in the form of coordinates. In step 409, the detected position is obtained as P(N)=(x(N), y(N)), an operation position PC=(Cx, Cy) is set at P(N), and P(N) and PC are stored in the storage unit 104. At the time of processing in step 409 in the first iteration, since the value of the counter N is 1, the coordinates obtained are P(1)=(x(1), y(1)), and these coordinates are used as the operation position PC. FIGS. 3c and 3d show states where the operation position PC has been set. The operation position PC is updated each time P(N) is obtained in step 409.

In step 410, on the basis of the operation reference position PA and the operation position PC, a displayed object 312 is displayed between the position corresponding to the operation reference position and the position corresponding to the operation position on the display unit 102. The displayed object 312 serves to clarify the direction from the operation reference position to the operation position to the user, and may be a displayed object such as an arrow, as shown in FIG. 3d, or a displayed object having elasticity. Furthermore, the displayed object 312 may have different widths or shapes depending on the distance between the operation reference position and the operation position. In this case, for example, image data corresponding to distances between operation reference positions and operation positions may be stored in advance in the storage unit 104 and a displayed object corresponding to a relevant distance may be displayed by a program, or a displayed object may be displayed in a shape that is modified so as to have dimensions corresponding to the distance.

In step 411, similarly to step 410, processing is executed on the basis of the operation reference position and the operation position. Preferably, the object 311 is moved on the basis of at least one of the direction from the operation reference position toward the operation position and the distance between the operation reference position and the operation position. Here, an example of specific processing in the case where the object 311 is moved on the basis of both the direction and the distance will be described below. The displacement Dx(AC) in the X coordinate and the displacement Dy(AC) in the Y coordinate of the operation position PC from the operation reference position PA are calculated on the basis of formulas given below and are stored in the storage unit 104. Here, these displacements are values involving plus or minus values and are not absolute values.

$$Dx(AC)=Cx-Ax \qquad (1)$$

$$Dy(AC)=Cy-Ay \qquad (2)$$

The positive or negative signs of the displacements Dx(AC) and Dy(AC) represent the direction of displacement from the operation reference position, and the absolute values thereof represent the distance from the operation reference position. With this information, the direction of displacement of the position touched by the user is determined, and the object 311 is controlled. If the value of the X-coordinate displacement Dx(AC) is positive, the direction of displacement from the operation reference position is rightward, and thus the object 311 is moved rightward. If the value of the X-coordinate displacement Dx(AC) is negative, the direction of displacement is leftward, and thus the object 311 is moved leftward. Similarly, if the value of the Y-coordinate displacement Dy(AC) is positive, the direction of displacement from the operation reference position is upward, and thus the object 311 is moved upward. If the value of the Y-coordinate displacement Dy(AC) is negative, the direction of displacement is downward, and thus the object 311 is moved downward. Alternatively, the object 311 may be made to jump in the case where the direction of displacement is upward, and the object 311 may be made to squat in the case where the direction of displacement is downward.

In the case where the finger 301 of the user touches the lower left region of the touchscreen 300 and is moved therefrom in the upper right direction, as shown in FIG. 3c, the values of the X- and Y-coordinate displacements of the position touched by the user are positive. In this case, the object 311 is also moved in the upper right direction. On the other hand, in the case where the position touched by the user is moved in the lower left direction, the values of the X- and Y-coordinate displacements of the position touched by the user are negative, and the object 311 is also moved in the lower left direction. FIG. 3d shows the displayed object 312 that is displayed as a result of movement of the touched position in FIG. 3c.

Furthermore, it is possible to set the movement speed of the object 311 correspondingly to the absolute values of Dx(AC) and Dy(AC). It is also possible to cancel movement of the object 311 in the case where the absolute values of Dx(AC) and Dy(AC) are less than a predetermined value. This prevents the object 311 from being moved in the case where the finger 301 of the user is unintendedly moved slightly. On the other hand, it is also possible to prohibit the object 311 from being moved at a speed exceeding a movement speed of the object 311 corresponding to a predetermined value in the case where the absolute value of Dx(AC) or Dy(AC) is greater than the predetermined value.

Step 410 and step 411 are processing based on the operation reference position and operation position set in the preceding steps, and the order of these steps may be exchanged.

Then, in step 412, it is determined whether or not the value of the counter N is 1. In the processing of this step, the value of the counter N is 1 at the time of processing in step 412 in the first iteration, and thus the processing proceeds to step 413. In step 413, a displacement reference position PB=(Bx, By) is set to the coordinates of P(1) and is stored in the storage unit 104. FIGS. 3c and 3d show states where the displacement reference position PB has been set. That is, it is determined in step 412 whether or not a displacement reference position has been set, and in the case where a displacement reference position has not been set, a displacement reference position is set in step 413, and the processing returns to step 406.

Figure 3E:
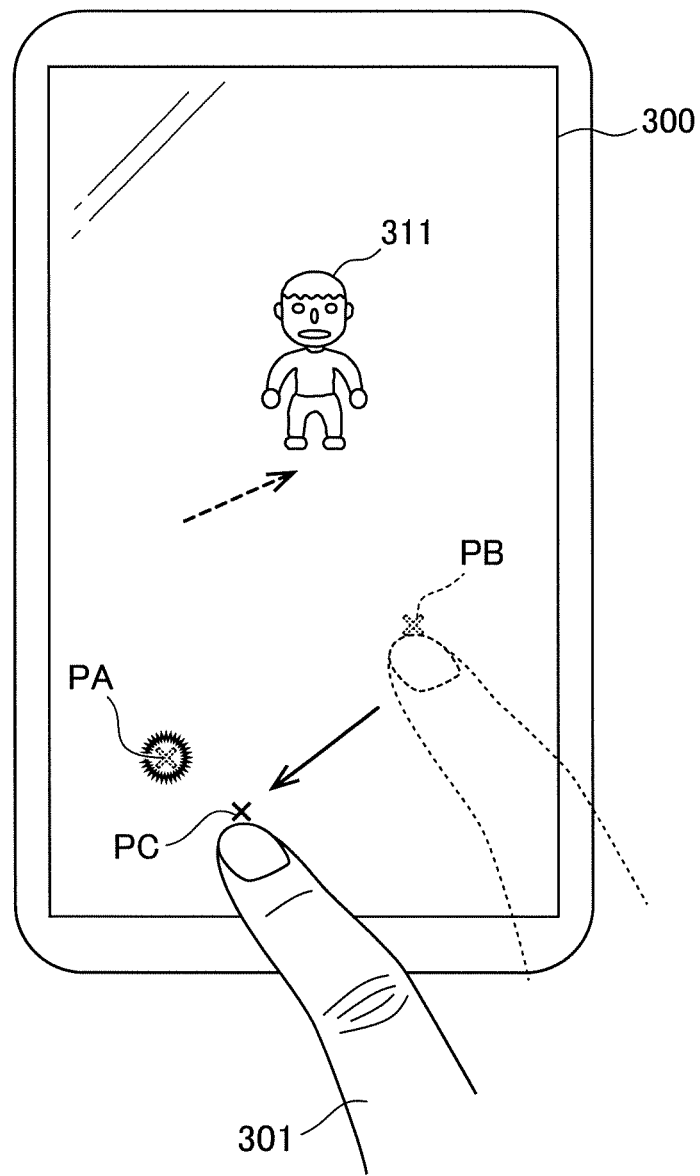
FIG. 3e is an illustration for explaining control of an object by a touch operation according to the embodiment of the present invention.
Figure 3F:
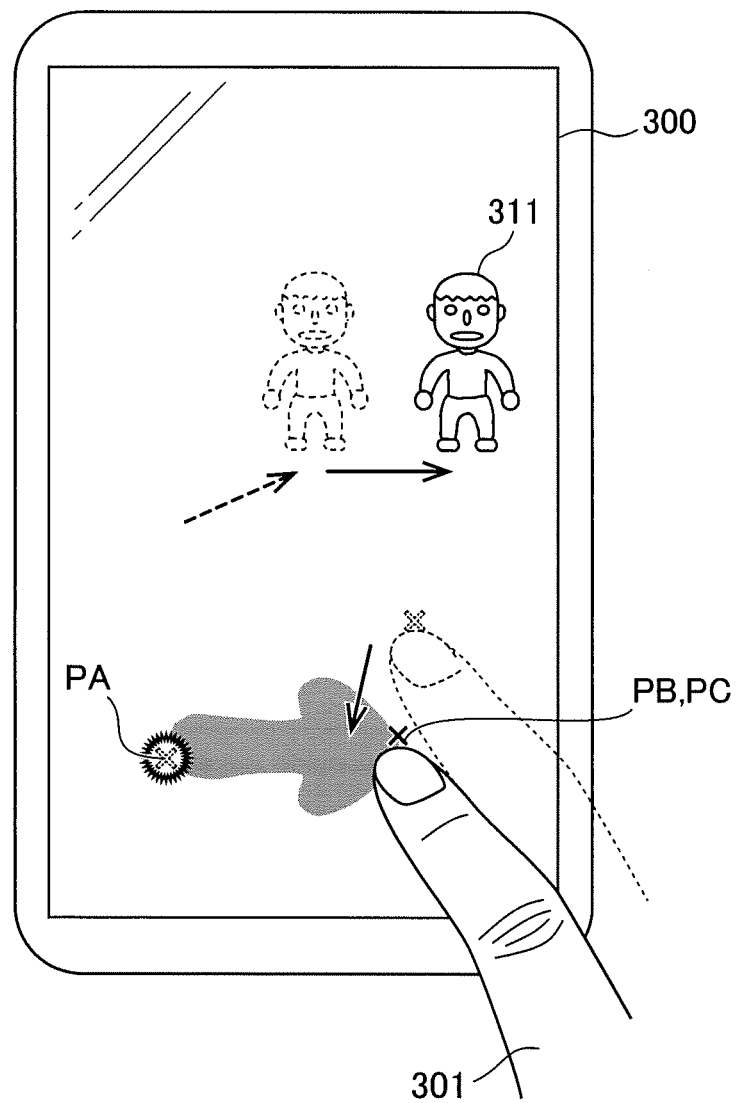
FIG. 3f is an illustration for explaining control of an object by a touch operation according to the embodiment of the present invention.

In step 406, the elapse of a certain period is awaited, as described earlier, and in step 407, the counter N is incremented. In the case where step 413 has been executed, the value of the counter N becomes 2 in step 407. Then, in step 408, it is determined whether or not the user is continuing to touch the touchscreen 300. In the case where the user has released the finger 301 from the touchscreen 300, the flow is terminated. In the case where it is determined that the user is continuing to touch the touchscreen 300, in step 409, the operation position PC is set at the obtained coordinates P(N) and is stored in the storage unit 104. In the case where step 413 has been executed, the obtained coordinates are P(2)=(x(2), y(2)), and these coordinates are used as the operation position PC. Then, in steps 410 and 411, the displayed object 312 is displayed on the display unit 102, and the object 311 is moved, as described earlier. FIGS. 3e and 3f show states at this time.

Then, in step 412, it is determined whether or not the value of the counter N is 1, and the processing proceeds to step 414 in the case where N is greater than or equal to 2. Steps 414 to 416 are steps for determining whether the movement of the touched position satisfies predetermined conditions. First, in step 414, it is determined whether or not any one of the interior angles of the triangle formed by three points PA=(Ax, Ay), PB=(Bx, By), and PC=(Cx, Cy) satisfies a predetermined criterion. In the case where the predetermined criterion is satisfied, the processing proceeds to step 415. In the case where the predetermined criterion is not satisfied, the processing returns to step 404, in which position data other than those of the operation reference position PA, the displacement reference position PB, and the operation position PC are cleared (step 404), the counter N is cleared (step 405), and then the processing proceeds to step 406.

Figure 3G:
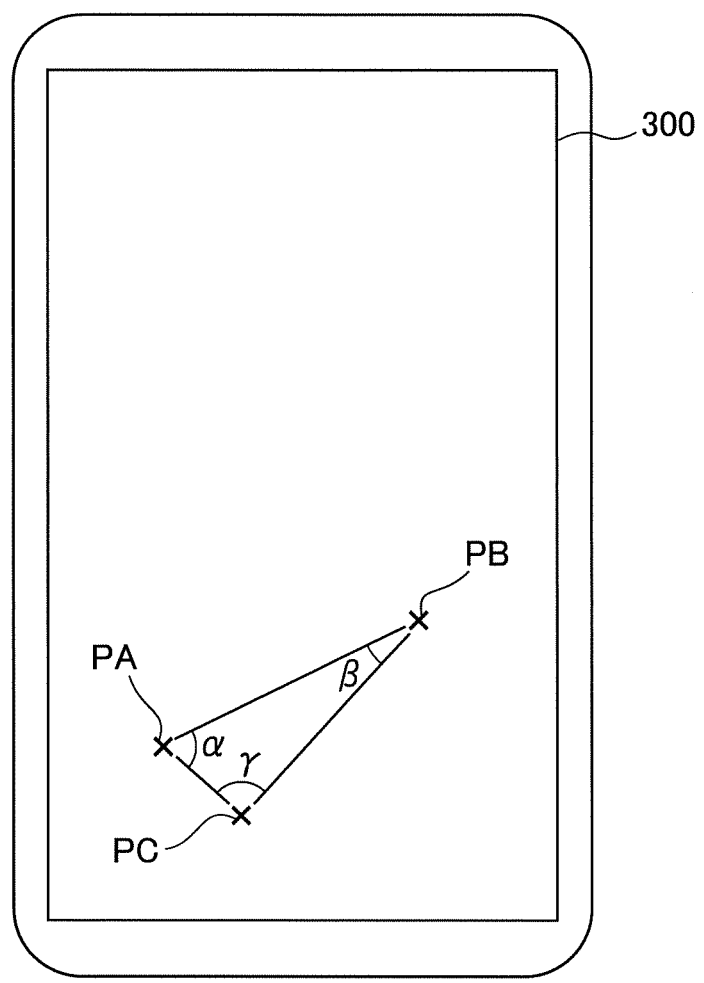
FIG. 3g is an illustration for explaining control of an object by a touch operation according to the embodiment of the present invention.

The predetermined criterion will be described below. Let the straight line interconnecting PA and PB be referred to as a straight line AB or a straight line BA, the straight line interconnecting PB and PC as a straight line BC or a straight line CB, and the straight line interconnecting PC and PA as a straight line CA or a straight line AC. Then, for example, the predetermined criterion is that the angle formed by the straight line BA and the straight line BC or the angle formed by the straight line CA and the straight line CB is smaller than or equal to a predetermined angle or that the angle formed by the straight line AB and the straight line AC is larger than or equal to the predetermined angle. An example of specific processing will be described below. FIG. 3g shows the operation reference position PA, the displacement reference position PB, and the operation position PC in FIG. 3e. For the purpose of explanation, let the angle formed by the straight line AB and the straight line AC be signified by α, the angle formed by the straight line BA and the straight line BC by β, and the angle formed by the straight line CA and the straight line CB by γ. As an example of the predetermined criterion, the predetermined criterion may be that the angle β formed by the straight line BA and the straight line BC is within ±25° (0°≤|β|≤25°). In this case, it is possible to calculate cos β on the basis of the formula given below.

$$\cos\beta = \frac{\overrightarrow{BA}\cdot\overrightarrow{BC}}{|\overrightarrow{BA}|\cdot|\overrightarrow{BC}|} \quad (3)$$

By using coordinates, cos β can be expressed by the formula given below.

$$\cos\beta = \frac{(Ax\ Bx)\cdot(Cx\ Bx) + (Ay\ By)\cdot(Cy\ By)}{\sqrt{(Ax-Bx)^2+(Ay-By)^2}+\sqrt{(Cx-Bx)^2+(Cy-By)^2}} \quad (4)$$

Thus, by storing the cos value corresponding to the above-mentioned predetermined angle in the storage unit 104 and comparing the cos value with the value of cos β, it is possible to execute processing for determining whether or not the predetermined criterion is satisfied. In this case, for example, it is determined that the predetermined criterion is satisfied if the value of cos β is greater than or equal to the value of cos(25°) (≈0.906). As another example of the predetermined criterion, the predetermined criterion may be that the angle α formed by the straight line AB and the straight line AC is larger than or equal to 90° and smaller than or equal to 270°. In this case, it is possible to calculate the value of cos α similarly to equations (3) and (4). In this case, it is determined that the predetermined criterion is satisfied if the calculated value of cos α is less than or equal to the value of cos(90°) (=0). As yet another example of the predetermined criterion, the predetermined criterion may be that the angle γ formed by the straight line CA and the straight line CB is within ±90° (cos γ≥0).

In the case where the predetermined criterion is satisfied, in step 415, it is determined whether PB=(Bx, By) and PC=(Cx, Cy) are separated by at least a predetermined distance Dth. For example, this is determined as follows. Letting the distance between PB and PC be signified by D, the distance D can be calculated as follows by using coordinates.

$$D=\sqrt{(Cx-Bx)^2+(Cy-By)^2} \quad (5)$$

Thus, it is possible to execute the determination processing by storing Dth in the storage unit 104 and comparing it with the value of the distance D. As described earlier, the distance here represents a distance in terms of the coordinates. However, considering the ease of operation for the user, there are cases where it is better to define the predetermined distance here as a distance by which a finger is actually moved or a certain ratio relative to the entire contact-type input unit, such as a touchscreen. In the case where the predetermined distance Dth is defined as a distance by which a finger is actually moved, it is possible to determine a desired value of Dth by inversely calculating it from the distance between dots for each of various types of touchscreen (individual contact-type input devices). In the case where the predetermined distance Dth is defined as a certain ratio relative to the size of the entire contact-type input unit, such as a touchscreen, it is possible to determine a desired value of Dth by defining a ratio of the predetermined distance Dth to the entire touchscreen for each touchscreen size (e.g., in inches).

In the case where PB and PC are separated by at least the predetermined distance, in step 416, it is determined whether the speed of movement of the position touched by the user from PB to PC is faster than or equal to a predetermined speed Vth. For example, this is determined as follows. Letting the speed of movement of the position touched by the user from PB to PC be signified by V, is possible to calculate the speed V as follows.

$$V = \frac{\sqrt{(Cx - Bx)^2 + (Cy - By)^2}}{(N-1) \cdot \Delta t} \qquad (6)$$

Thus, it is possible to execute the determination processing by storing Vth in the storage unit 104 and comparing it with the value of V. In the case where V is less than Vth, similarly to the case where the predetermined criterion is not satisfied in step 414, the processing returns to step 404.

In the case where V is greater than or equal to Vth, in step 417, the operation reference position PA is reset at the coordinates of the displacement reference position PB.

Figure 3H:
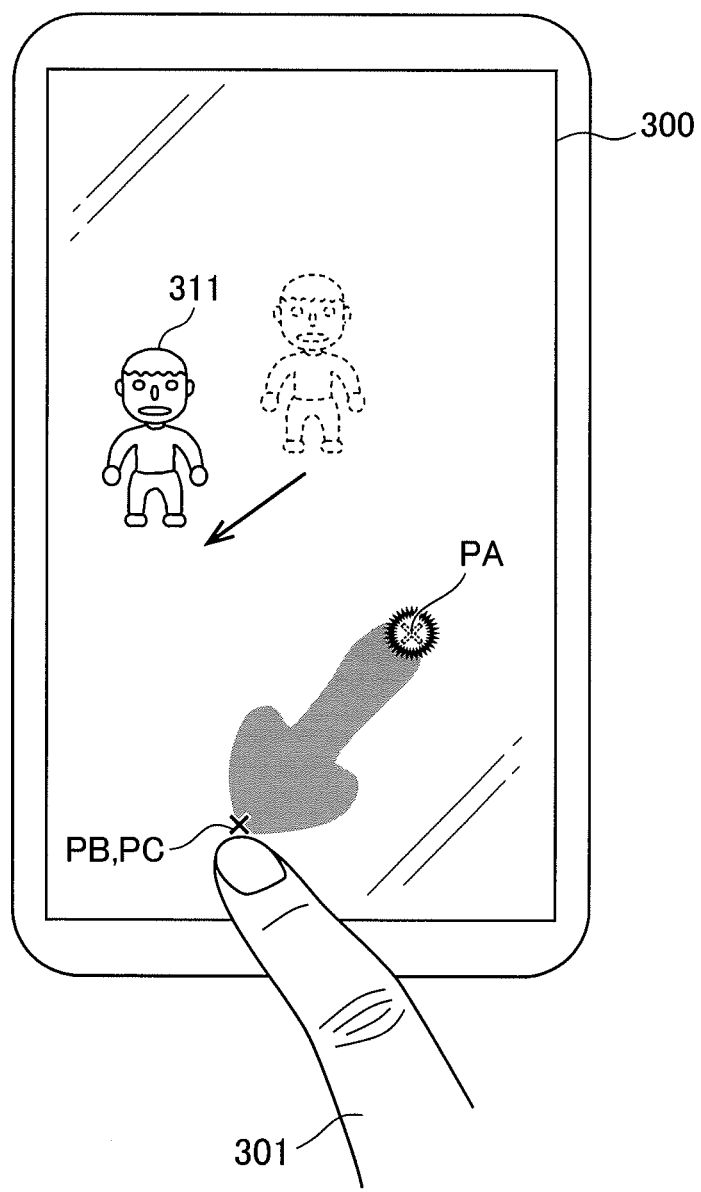
FIG. 3h is an illustration for explaining control of an object by a touch operation according to the embodiment of the present invention.

As an example, FIG. 3e shows an example of a case where the user moves the touched position from the state in FIG. 3d and the movement of the touched position satisfies the conditions in steps 414 to 416 described above. When these conditions are satisfied, the operation reference position PA is reset at the position of the former displacement reference position PB, as shown in FIG. 3h. With this resetting, the direction from the operation reference position PA toward the operation position PC, which is in the upper right direction in FIG. 3d, is changed to the lower left direction in FIG. 3h. That is, it becomes possible to move the object 311 in the direction opposite to the direction of the immediately preceding movement. At this time, since the user can reverse the direction so as to move the object 311 in the opposite direction without speeding down, the user can quickly avoid an approaching obstacle (not shown). In step 417, the coordinates at which the operation reference position PA is reset are not limited to the coordinates of the displacement reference position PB, and the operation reference position PA may be reset at certain coordinates based on the coordinates of the displacement reference position PB and/or the operation position PC. For example, the operation reference position PA may be reset at an arbitrary point on the straight line interconnecting PB and PC. Alternatively, the operation reference position PA may be reset at the coordinates of the operation position PC.

As another example, FIG. 3f shows an example of a case where the user moves the touched position from the state in FIG. 3d and the movement of the touched position does not satisfy the condition in step 414 described above. In the case where this condition is not satisfied, the processing returns to step 404. In this case, the operation reference position PA is not changed, and the operation position PC is set in step 409, and the operation reference position PB is set in step 413. Thus, in the case where the touched position is moved without satisfying the condition in step 414, the displacement reference position PB is set sequentially at the operation position PC at the destination of the movement of the touched position. Furthermore, in FIG. 3f, since the direction from the operation reference position PA to the operation position PC is the rightward direction, the object 311 is moved rightward.

After the operation reference position PA is reset in step 417, the processing returns to step 404, and the processing according to the present flowchart is continued until it is not determined in step 408 that the user is continuing the touch.

Figure 3I:
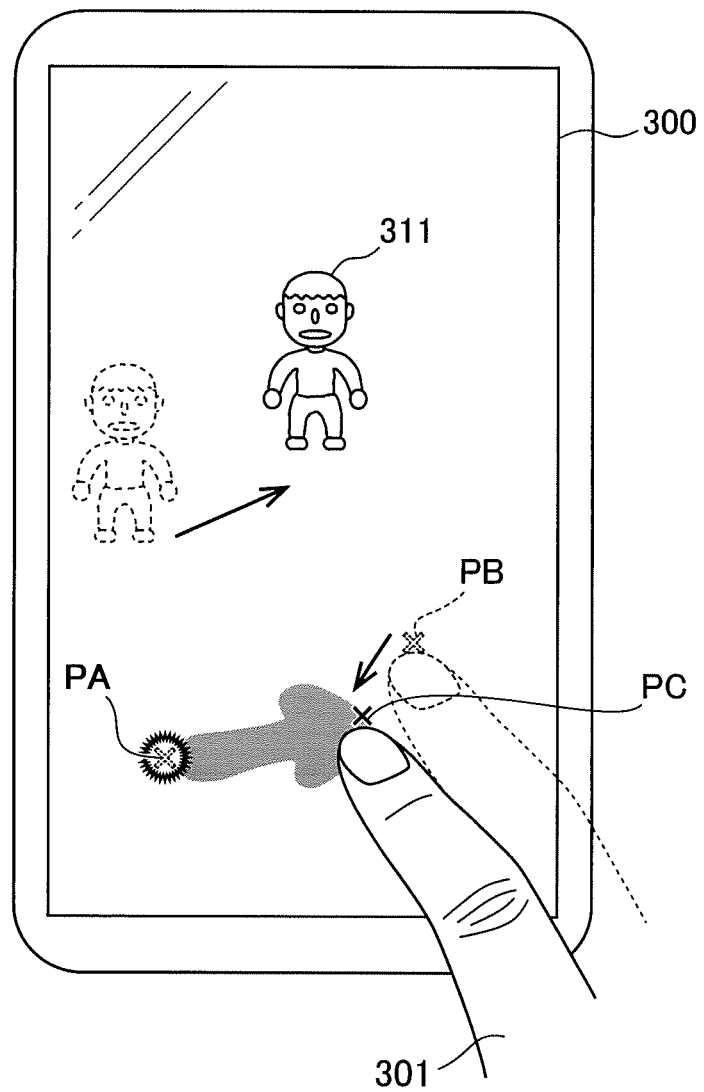
FIG. 3i is an illustration for explaining control of an object by a touch operation according to the embodiment of the present invention.

Next, the case where PB and PC are not separated by at least the predetermined distance in step 415 will be described. In this case, the processing returns to step 406. In step 406, the elapse of the certain time is awaited, and in step 407, the counter N is incremented. In the case where step 415 has been executed, in step 407, the value of the counter N becomes greater than or equal to 3. Then, in step 408, it is determined whether or not the user is continuing the touch. In the case where the user has released the finger 301 from the touchscreen 300, the flow is terminated. In the case where it is determined that the user is continuing the touch, in step 409, the operation position PC is set at the obtained coordinates P(N). Then, in steps 410 and 411, the displayed object 312 is displayed on the display unit 102, and the object 311 is moved, as described earlier. FIG. 3i shows the state at this time, i.e., an example of a case where the user moves the touched position from the state in FIG. 3d and the movement of the touched position does not satisfy the condition in step 415. It can be understood in FIG. 3i that the operation reference position PA and the displacement reference position PB are not changed and the operation position PC is changed. Then, through step 412 and step 414, again in step 415, it is determined whether PB and PC are separated by at least the predetermined distance Dth. It is to be noted, however, that the processing returns to step 404 in the case where the predetermined criterion is not satisfied in step 414. The processing proceeds to step 416 in the case where PB and PC are separated by at least the predetermined distance, and otherwise the processing from step 406 is iterated. In each iteration, the counter N is incremented in step 407.

However, if steps 406 to 415 are continuously executed for a certain number of iterations or more, the operation is continuously subjected to the effects of old data, and thus there is a possibility that the user's latest intent is not sufficiently reflected in the determinations. Thus, the determinations as to whether the movement of the touched position satisfies the predetermined conditions in steps 414 to 416 should preferably be executed at a time scale with which the user's intent will be reflected appropriately.

Figure 4C:
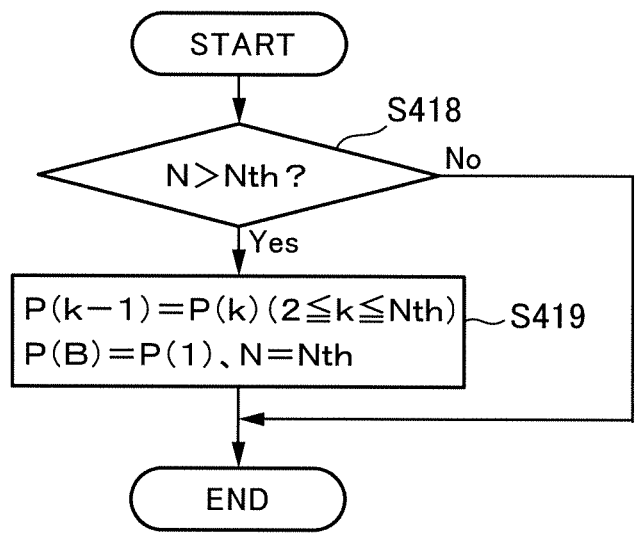
FIG. 4c is a flowchart according to the first embodiment of the present invention.

Therefore, preferably, in the case where PB and PC are not separated by at least the predetermined distance in step 415, for example, processing according to FIG. 4c is executed before returning to step 406.

In the flow shown in FIG. 4c, first, in step 418, it is determined whether the value of the counter N is greater than a predetermined value Nth. In the case where the value of the counter N is less than or equal to the predetermined value Nth, the processing returns to step 406, and the flow is continued. In the case where the value of the counter N exceeds the predetermined value Nth, the processing proceeds to step 419. In step 419, the coordinate data P(N) is replaced in a stepwise manner as expressed below.

$$P(k) = P(k+1) \quad (1 \le k \le Nth-1) \qquad (7)$$

Equation (7) indicates that P(1) becomes the former P(2), P(2) becomes the former P(3), . . . , and P(Nth−1)=P(Nth). With this processing, data of the former P(1) is deleted. Furthermore, the displacement reference position PB is reset at the position of the coordinates of the updated P(1), and the value of the counter N is set to be Nth. With this processing, it is possible to keep the amount of data stored as the coordinate data P(N) constant and to delete the oldest data.

Figure 4D:
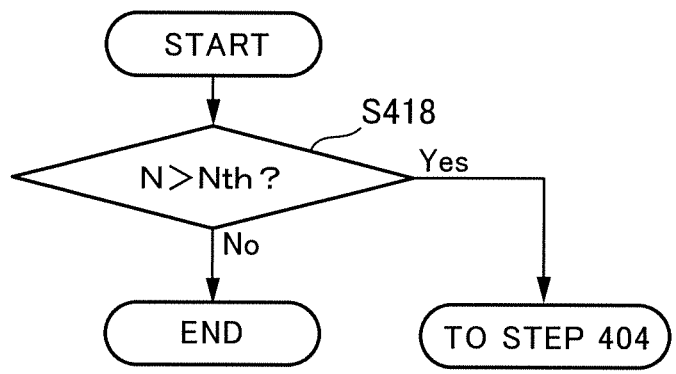
FIG. 4d is a flowchart according to the first embodiment of the present invention.

As an alternative to the flow in FIG. 4c, the flow in FIG. 4d may be adopted. In this flow, the processing returns to step 406 in the case where the value of the counter N is less than or equal to the predetermined value Nth in step 418, and the processing returns to step 404 in the case where the counter N exceeds the predetermined value Nth. With this processing flow, the ease of operation aimed at by the present invention is maintained. Furthermore, even in the case where such a flow is not included, it is also possible to implement a processing flow with which the ease of operation aimed at by the present invention is maintained by using a ring buffer for the memory that stores the coordinate data P(N).

The first embodiment described above is an embodiment involving an angle condition (step 414), a distance condition (step 415), and a speed condition (step 416) as conditions of a movement of the touched position that are needed for resetting the operation reference position PA. With the angle condition determination, it is possible to determine the user's intent to reverse the direction so as to move the object 311 in the direction opposite to the direction of the immediately preceding movement. For example, in the case where the angle α formed by the straight line AB and the straight line BC is smaller than or equal to 25°, it is conceivable that this indicates the user's intent to reverse the direction so as to move the object 311 in the direction opposite to the direction of the immediately preceding movement. Furthermore, with the distance condition and speed condition determinations, it is possible not to reset the operation reference position in the case where the touched position is moved only slightly. This prevents resetting of the operation reference position due to hand shaking or other causes not based on the user's intent of reversing operation. Furthermore, by resetting the operation reference position only in the case where all of these three conditions are satisfied, it is possible to reduce the possibility of resetting of the operation reference position not intended by the user. However, it is possible to determine the user's intent by executing at least the angle condition determination, without having to execute all these condition determinations.

Second Embodiment

A second embodiment of the present invention will now be described. As shown in FIG. 4e, this embodiment is the same as the first embodiment except that the processing returns to step 406 instead of step 404 in the case where V is less than Vth in step 416 in the first embodiment.

In this flowchart, in the case where the speed condition is not satisfied in step 416, the processing returns to step 406, and thus the acquired coordinate data, the counter N, and the displacement reference position are not reset. This makes it possible to perform averaging over a longer period, compared with the first embodiment, in the determination as to the speed condition about movement of a position touched by the user. Preferably, similarly to the first embodiment, for example, the processing according to FIG. 4c is executed before returning to step 406.

Third Embodiment

Figure 4F:
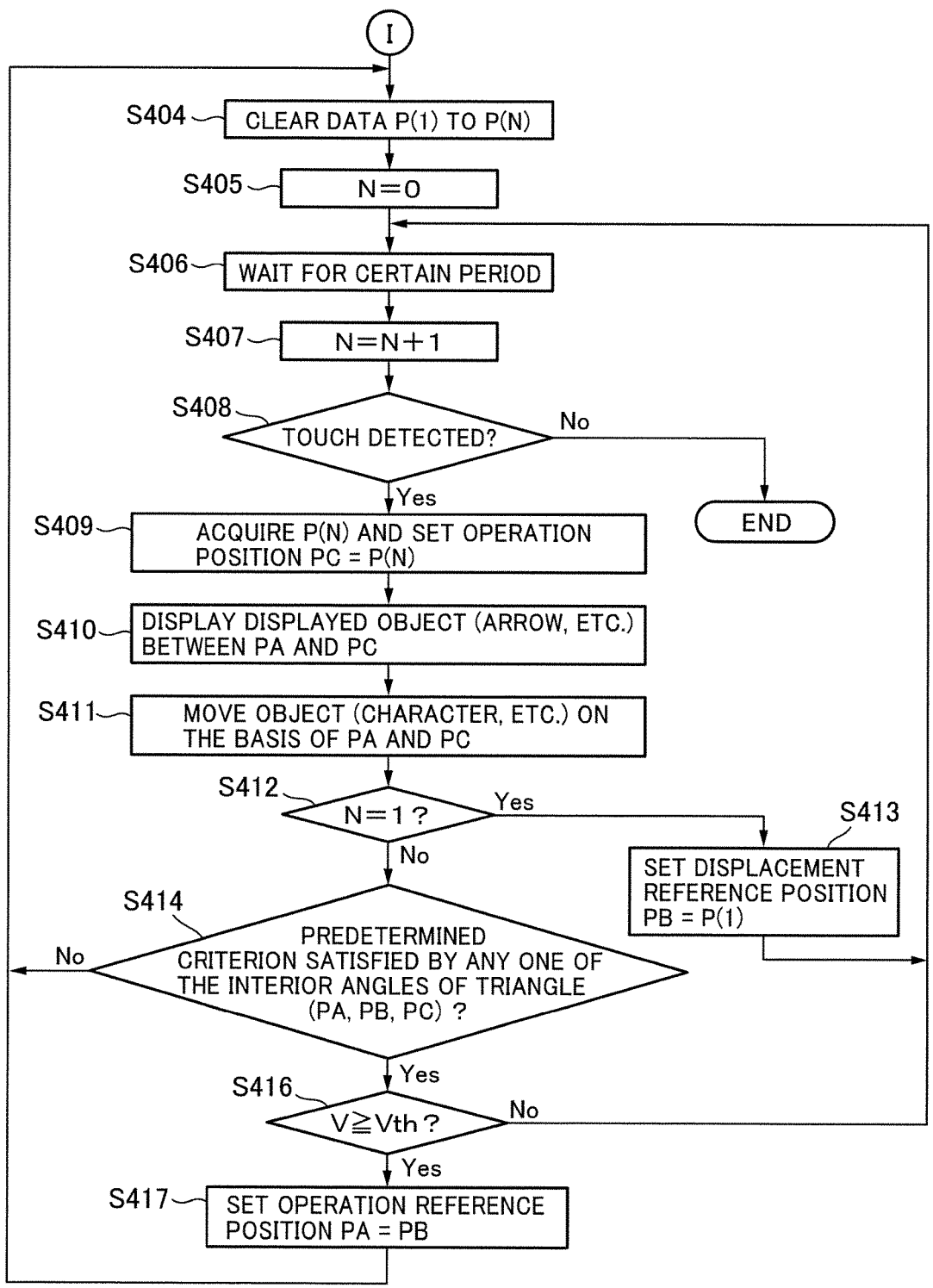
FIG. 4f is a flowchart according to a third embodiment of the present invention.

A third embodiment of the present invention will now be described. As shown in FIG. 4f, this embodiment is the same as the second embodiment except in that step 415 in the second embodiment is not executed.

In this flowchart, the determination processing in step 416 is executed as long as the angle condition is satisfied in step 414. This makes it possible to reduce conditions involved in determination processing. Furthermore, similarly to the second embodiment, it becomes possible to perform averaging over a longer period, compared with the first embodiment, in the determination as to the speed condition about movement of a position touched by the user. Preferably, similarly to the second embodiment, for example, the processing according to FIG. 4c is executed before returning to step 406.

Fourth Embodiment

Figure 4G:
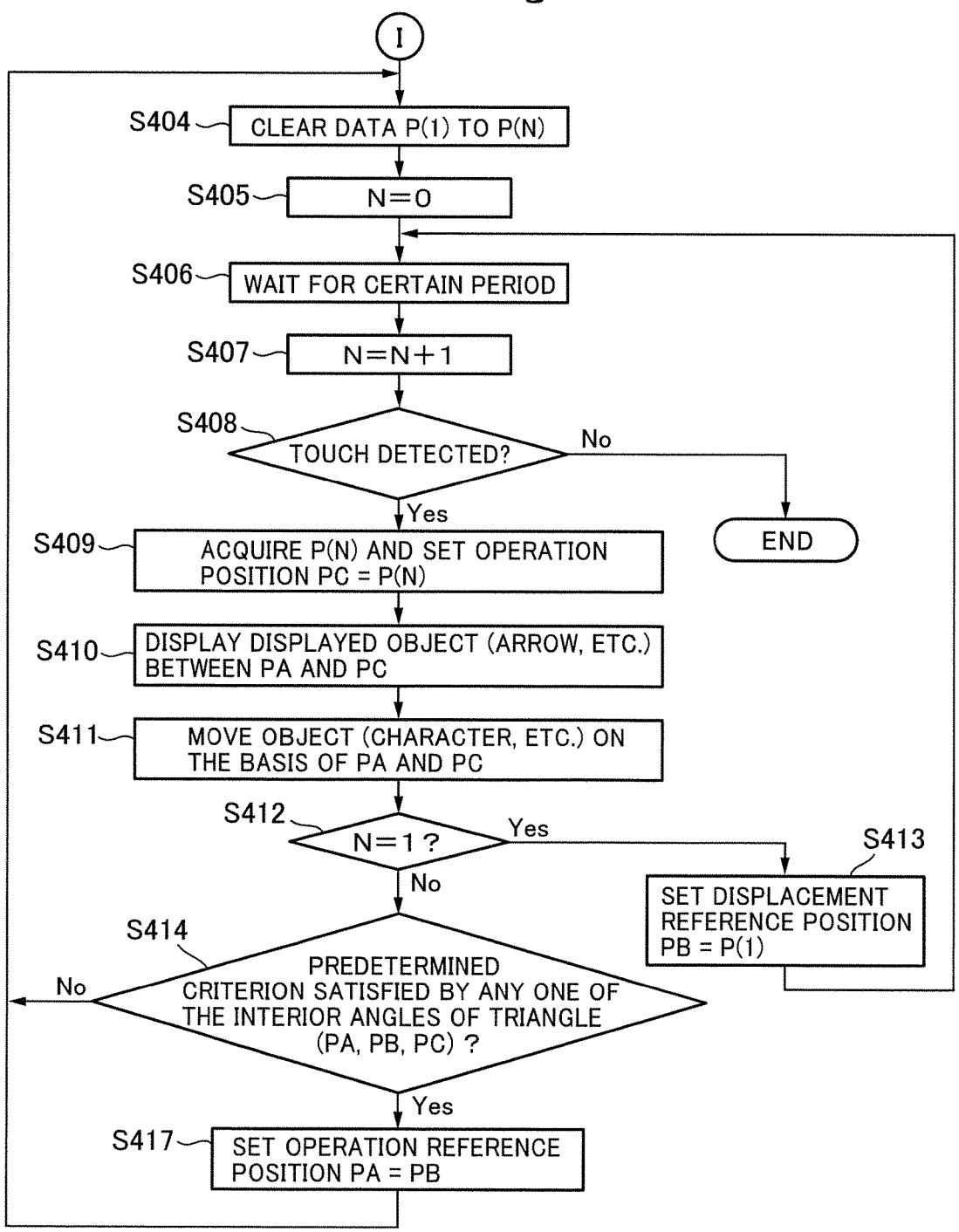
FIG. 4g is a flowchart according to a fourth embodiment of the present invention.

A fourth embodiment of the present invention will now be described. As shown in FIG. 4g, this embodiment is the same as the third embodiment except that step 416 in the third embodiment is not executed.

In this flowchart, the operation reference position is reset when the angle condition is satisfied in step 414. This makes it possible to reduce conditions involved in determination processing. This embodiment can be effective in cases requiring frequent reversing operations.

Fifth Embodiment

A fifth embodiment of the present invention will now be described. This embodiment is a computer-readable storage medium having stored thereon a program for realizing the above-described operation of the present invention.

Sixth Embodiment

A sixth embodiment of the present invention will now be described. This embodiment is a server that can supply a program for realizing the above-described operation of the present invention to an electronic device. The server allows the electronic device to download the program by way of wired or wireless communication.

Seventh Embodiment

A seventh embodiment of the present invention will now be described. This embodiment is an electronic device including electronic circuits for realizing a part or the entirety of the above-described operation of the present invention.

In the processing or operation described above, the processing or operation can be modified freely as long as no inconsistency occurs in the processing or operation, such as an inconsistency that a certain step involves the use of data that could not yet be available in that step.

The embodiments described above are examples for explaining the present invention, and the present invention is not limited to the embodiments. For example, the embodiments can be combined with each other, which makes it possible to combine two or more of the embodiments into a single embodiment, and it is also possible to implement a part of one of the embodiments as a single embodiment. The present invention can be embodied in various forms as long as those forms are within the scope thereof.

REFERENCE SIGNS LIST

100 Electronic device
101 Processing unit
102 Display unit
103 Contact-type input unit
104 Storage unit
105 Communication unit
106 Internal memory
107 External memory
110 Bus
300 Touchscreen
301 User's finger
311 Object
312 Displayed object

The invention claimed is:

1. A non-transitory computer readable medium storing a program for a game that is executed on an electronic device that includes a display and a contact-type position input device and that acquires a touched position corresponding to a touch on the contact-type position input device as coordinates in a coordinate plane corresponding to an input position on the contact-type position input device, the program causing the electronic device to execute:
a step of setting an operation reference position in the coordinate plane;
a step of determining whether a touch is being made on the contact-type position input device;
a step of setting an operation position in the coordinate plane in accordance with a touched position that is acquired in a case where a touch is being made on the contact-type position input device;
a step of moving an object that is displayed on the display in the game, on the basis of the operation reference position and the operation position;
a step of retaining the operation position as a displacement reference position;
a step of detecting a touched-position movement from the displacement reference position, the touched-position movement satisfying a predetermined condition; and
a step of resetting the operation reference position in the coordinate plane in a case where a touched-position movement satisfying the predetermined condition is detected,
wherein the predetermined condition at least includes a condition that a predetermined criterion is satisfied by one of the interior angles of a triangle formed by three points consisting of a displacement position, the operation reference position, and the displacement reference position, the displacement position being a touched position that is acquired after the operation position retained as the displacement reference position is acquired.

2. The non-transitory computer readable medium according to claim 1, wherein, in the step of moving an object that is displayed on the display in the game, the object that is displayed on the display in the game is moved on the basis of at least one of the direction from the operation reference position toward the operation position and the distance between the operation reference position and the operation position.

3. The non-transitory computer readable medium according to claim 1, wherein the predetermined criterion is a criterion that the angle formed by a straight line BA and a straight line BC or the angle formed by a straight line CA and a straight line CB is smaller than or equal to a predetermined angle or the angle formed by a straight line AB and a straight line AC is larger than or equal to the predetermined angle, where A signifies the operation reference position, B signifies the displacement reference position, and C signifies the displacement position.

4. The non-transitory computer readable medium according to claim 1, wherein the predetermined condition further includes a condition that the speed of the touched-position movement from the displacement reference position to the displacement position is faster than or equal to a predetermined speed.

5. The non-transitory computer readable medium according to claim 1, wherein the predetermined condition further includes a condition that the displacement position is distant from the displacement reference position by at least a predetermined distance.

6. The non-transitory computer readable medium according to claim 1, wherein, in the step of setting an operation reference position on the contact-type input device, an operation reference position is set on the basis of a position at which the acquisition of a touched position is started.

7. The non-transitory computer readable medium according to claim 1, wherein, in the step of resetting the operation reference position in a case where a touched-position movement satisfying the predetermined condition is detected, the operation reference position is reset on the basis of at least one of the displacement reference position and the displacement position in a case where a touched-position movement satisfying the predetermined condition is detected.

8. The non-transitory computer readable medium according to claim 1, wherein the program further causes the electronic device to execute:
a step of displaying a displayed object between a position corresponding to the operation reference position and a position corresponding to the operation position on the display, the displayed object serving to explicitly indicate the direction from the operation reference position toward the operation position to a user.

9. The non-transitory computer readable medium according to claim 1, wherein the electronic device is a portable electronic device, and the display and the contact-type position input device are implemented together in the form of a touchscreen.

10. A server that supplies the program according to claim 1 to an electronic device.

11. An electronic device including a display, a contact-type position input device, and a non-transitory computer readable medium having stored thereon a program for a game, in which a touched position corresponding to a touch on the contact-type position input device is acquired as coordinates in a coordinate plane corresponding to an input position on the contact-type position input device, the program causing the electronic device to execute:
a step of setting an operation reference position in the coordinate plane;
a step of determining whether a touch is being made on the contact-type position input device;
a step of setting an operation position in the coordinate plane in accordance with a touched position that is acquired in a case where a touch is being made on the contact-type position input device;
a step of moving an object that is displayed on the display in the game, on the basis of the operation reference position and the operation position;
a step of retaining the operation position as a displacement reference position;
a step of detecting a touched-position movement from the displacement reference position, the touched-position movement satisfying a predetermined condition; and
a step of resetting the operation reference position in the coordinate plane in a case where a touched-position movement satisfying the predetermined condition is detected,
wherein the predetermined condition at least includes a condition that a predetermined criterion is satisfied by one of the interior angles of a triangle formed by three points consisting of a touched position that is acquired after the operation position retained as the displacement reference position is acquired, the operation reference position, and the displacement reference position.

12. An electronic device that includes a display and a contact-type position input device and that is capable of executing a game, the electronic device comprising:

a touched-position acquisition unit configured to acquire a touched position corresponding to a touch on the contact-type position input device as coordinates in a coordinate plane corresponding to an input position on the contact-type position input device;

an operation-reference-position setting part configured to set an operation reference position in the coordinate plane;

an operation position setting part configured to set an operation position in the coordinate plane in accordance with a touched position that is acquired in a case where a touch is being made on the contact-type position input device;

an object displaying part configured to move an object that is displayed on the display in the game, on the basis of the operation reference position and the operation position;

a displacement-reference-position retaining part configured to retain the operation position as a displacement reference position;

a touch-operation detecting part configured to detect a touched-position movement from the displacement reference position, the touched-position movement satisfying a predetermined condition; and an operation-reference-position resetting part configured to reset the operation reference position in the coordinate plane in a case where a touched-position movement satisfying the predetermined condition is detected, wherein the predetermined condition at least includes a condition that a predetermined criterion is satisfied by one of the interior angles of a triangle formed by three points consisting of a touched position that is acquired after the operation position retained as the displacement reference position is acquired, the operation reference position, and the displacement reference position.

13. A method for a game that is executed at an electronic device that includes a display and a contact-type position input device and that acquires a touched position corresponding to a touch on the contact-type position input device as coordinates in a coordinate plane corresponding to an input position on the contact-type position input device, the method comprising:

a step of setting an operation reference position in the coordinate plane;

a step of determining whether a touch is being made on the contact-type position input device;

a step of setting an operation position in the coordinate plane in accordance with a touched position that is acquired in a case where a touch is being made on the contact-type position input device;

a step of moving an object that is displayed on the display in the game, on the basis of the operation reference position and the operation position;

a step of retaining the operation position as a displacement reference position;

a step of detecting a touched-position movement from the displacement reference position, the touched-position movement satisfying a predetermined condition; and a step of resetting the operation reference position in the coordinate plane in a case where a touched-position movement satisfying the predetermined condition is detected, wherein the predetermined condition at least includes a condition that a predetermined criterion is satisfied by one of the interior angles of a triangle formed by three points consisting of a touched position that is acquired after the operation position retained as the displacement reference position is acquired, the operation reference position, and the displacement reference position.

\* \* \* \* \*